(12) United States Patent
Bean

(10) Patent No.: US 10,589,668 B2
(45) Date of Patent: Mar. 17, 2020

(54) CAUTION INDICATOR

(71) Applicant: Michael Bean, Bunkie, LA (US)

(72) Inventor: Michael Bean, Bunkie, LA (US)

(*) Notice: Subject to any disclaimer, the term of this patent is extended or adjusted under 35 U.S.C. 154(b) by 397 days.

(21) Appl. No.: 15/429,902

(22) Filed: Feb. 10, 2017

(65) Prior Publication Data

US 2018/0229652 A1 Aug. 16, 2018

(51) Int. Cl.
*B60Q 7/02* (2006.01)
*G09F 13/16* (2006.01)
*G09F 13/20* (2006.01)

(52) U.S. Cl.
CPC .............. *B60Q 7/02* (2013.01); *G09F 13/16* (2013.01); *G09F 13/20* (2013.01)

(58) Field of Classification Search
CPC ............ B60Q 7/02; G09F 13/16; G09F 13/20
See application file for complete search history.

(56) References Cited

U.S. PATENT DOCUMENTS

| | | | | |
|---|---|---|---|---|
| 857,435 A * | 6/1907 | Bell | ...................... | B65D 85/324 206/521.1 |
| 1,096,580 A * | 5/1914 | Webb | .................. | G09F 15/0037 40/606.12 |
| 1,535,844 A * | 4/1925 | McLemore | ............... | B60Q 7/02 116/28 R |
| 1,595,395 A * | 8/1926 | Herbener | ................. | G09F 17/00 116/173 |
| 1,635,915 A * | 7/1927 | White | ...................... | G08B 5/02 114/221 R |
| 1,787,150 A * | 12/1930 | Gerow | ..................... | E04H 12/32 116/173 |
| 1,819,768 A * | 8/1931 | Coffing | ................... | E04H 12/32 116/173 |
| 1,859,599 A * | 5/1932 | Quinn | ...................... | B60Q 1/50 116/173 |
| 1,893,585 A * | 1/1933 | Hogan | .................... | G09F 17/00 116/173 |
| 2,130,467 A * | 9/1938 | MacKay | .................. | B60Q 1/30 116/28 R |

(Continued)

FOREIGN PATENT DOCUMENTS

CN 102635386 A 8/2012
WO 2014047713 A1 4/2014

OTHER PUBLICATIONS

CN 102635386 A, Warning air-draft tube, Google patents English version web-page, https://www.google.com/patents/CN102635386A?cl=en&dq=CN+102635386+A&hl=en&sa=X&ved=0ahUKEwiY2dbVsefQAhXlgFQKHccxCV8Q6AEIHDAA, printed Dec. 9, 2016.

(Continued)

*Primary Examiner* — Nimeshkumar D Patel
*Assistant Examiner* — Tania Courson
(74) *Attorney, Agent, or Firm* — John B. Edel; Edel Patents LLC

(57) ABSTRACT

Caution indicators are disclosed relating to transportation safety that include a sleeve, a primary opening and a protruding end opposite the primary opening. The sleeve may be 5 or more feet long; with the primary opening being at least as big as the protruding end. The sleeve may include both florescent material and retroreflective material. Use of such caution indicators may increase safety in the transport of long objects such as utility poles.

16 Claims, 2 Drawing Sheets

(56) References Cited

U.S. PATENT DOCUMENTS

| | | | | |
|---|---|---|---|---|
| 2,166,520 A * | 7/1939 | Challoner | G08B 5/02 | 116/28 R |
| 2,726,058 A * | 12/1955 | Foltz | G01B 5/25 | 248/230.9 |
| 3,041,580 A * | 6/1962 | Bos | B60Q 1/305 | 116/202 |
| 3,080,581 A * | 3/1963 | Smihal | B60P 3/10 | 114/343 |
| 3,181,849 A * | 5/1965 | Mitchell | E01F 15/141 | 267/140 |
| 3,209,722 A * | 10/1965 | Thomsen | E04H 12/32 | 116/173 |
| 3,276,416 A * | 10/1966 | Dirks | B60Q 1/30 | 116/200 |
| 3,319,328 A * | 5/1967 | Finger | H02G 7/00 | 138/89 |
| 3,512,288 A * | 5/1970 | Hall | E01F 9/662 | 192/224 |
| 3,678,886 A * | 7/1972 | Tibbet | G09F 17/00 | 116/173 |
| 3,945,337 A * | 3/1976 | Sweetman | B62J 6/00 | 116/36 |
| 4,105,190 A * | 8/1978 | Curtis | E01F 13/028 | 116/63 P |
| 5,349,772 A * | 9/1994 | Pardue | B60R 13/00 | 40/590 |
| 5,383,296 A * | 1/1995 | Vecchione | G09F 17/00 | 40/604 |
| 5,423,281 A * | 6/1995 | Crookham | G09F 17/00 | 116/173 |
| 5,481,244 A * | 1/1996 | Dicke | B60Q 7/02 | 114/343 |
| 5,709,455 A * | 1/1998 | Danekas | B60Q 1/32 | 359/548 |
| RE35,831 E * | 6/1998 | Wright | B64F 1/005 | 150/154 |
| 5,869,159 A * | 2/1999 | Padilla | B32B 7/12 | 428/40.1 |
| 5,943,963 A * | 8/1999 | Beals | B61D 45/001 | 105/355 |
| 5,979,355 A * | 11/1999 | LeBlanc | B60Q 7/02 | 116/173 |
| 6,363,644 B1 * | 4/2002 | Frost | G09F 15/00 | 40/538 |
| 6,520,469 B1 * | 2/2003 | DiMauro | B60P 3/40 | 248/219.1 |
| 6,772,711 B2 * | 8/2004 | Morgan | A01K 27/006 | 119/795 |
| 6,789,496 B2 * | 9/2004 | Gehris | G09F 17/00 | 116/173 |
| 6,976,786 B1 * | 12/2005 | Stanley, Jr. | A45C 9/00 | 383/117 |
| 7,364,315 B2 * | 4/2008 | Chien | A41D 27/085 | 362/103 |
| 7,395,776 B2 | 7/2008 | Harruna | | |
| 7,401,570 B2 * | 7/2008 | Moore | B64F 1/005 | 116/1 |
| 7,530,187 B1 | 5/2009 | Dreka | | |
| 7,752,991 B2 * | 7/2010 | Graves | B60Q 7/02 | 116/28 R |
| 8,234,996 B2 * | 8/2012 | Smith | B07B 13/00 | 116/1 |
| 8,769,851 B2 * | 7/2014 | Picard | G09F 13/00 | 40/606.12 |
| D720,192 S * | 12/2014 | Hayman | D8/1 | |
| 8,935,987 B2 * | 1/2015 | Edwards | B64D 45/00 | 116/28 R |
| 9,909,270 B1 * | 3/2018 | Bonifacio | G09F 15/0037 | |
| 10,046,226 B2 * | 8/2018 | Pitlyk | A63B 71/06 | |
| 2004/0025391 A1 * | 2/2004 | Storm | G09F 11/29 | 40/591 |
| 2006/0294168 A1 * | 12/2006 | Scott | H02G 7/00 | 708/160 |
| 2012/0177868 A1 * | 7/2012 | Horgash | G09F 15/0031 | 428/100 |
| 2016/0107764 A1 * | 4/2016 | O'Kell | B64D 47/06 | 116/28 R |

OTHER PUBLICATIONS

International Safety Equipment Association, Frequently Addressed Topics in High Visibility Safety Apparel, PPE Perspectives, https://safetyequipment.org/wp-content/uploads/2016/02/FAQ-HVSA-2016June-1.pdf.

* cited by examiner

CAUTION INDICATOR

Caution indicators described herein may be used in the field of transportation safety. Certain caution indicators disclosed herein may aid in the safe transport of utility poles. Caution indicators described herein may have particular utility by increasing the visibility of utility poles that protrude beyond vehicles transporting those poles.

DETAILED DESCRIPTION

Example 1

Figure 1:
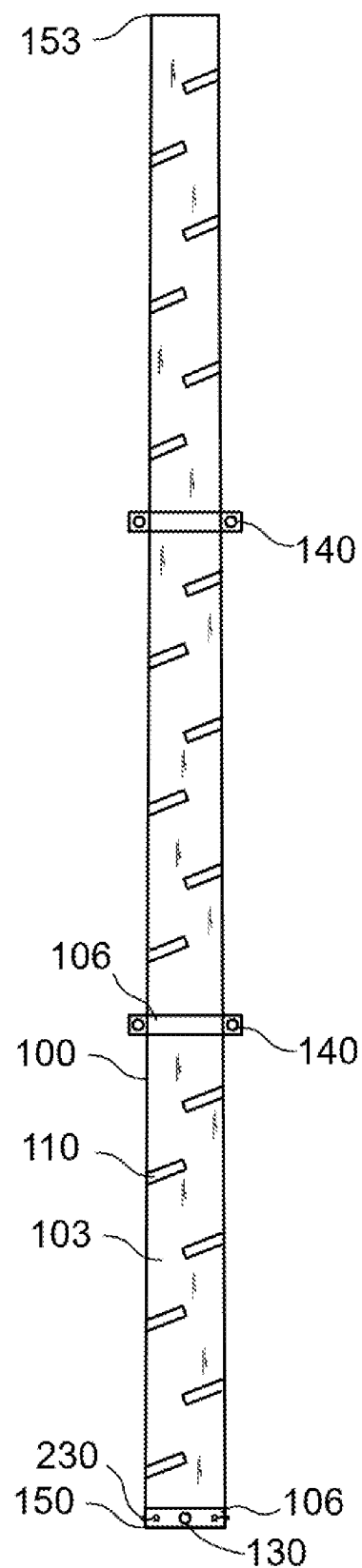
FIG. 1 shows a plan view of a caution sleeve.
Figure 2:
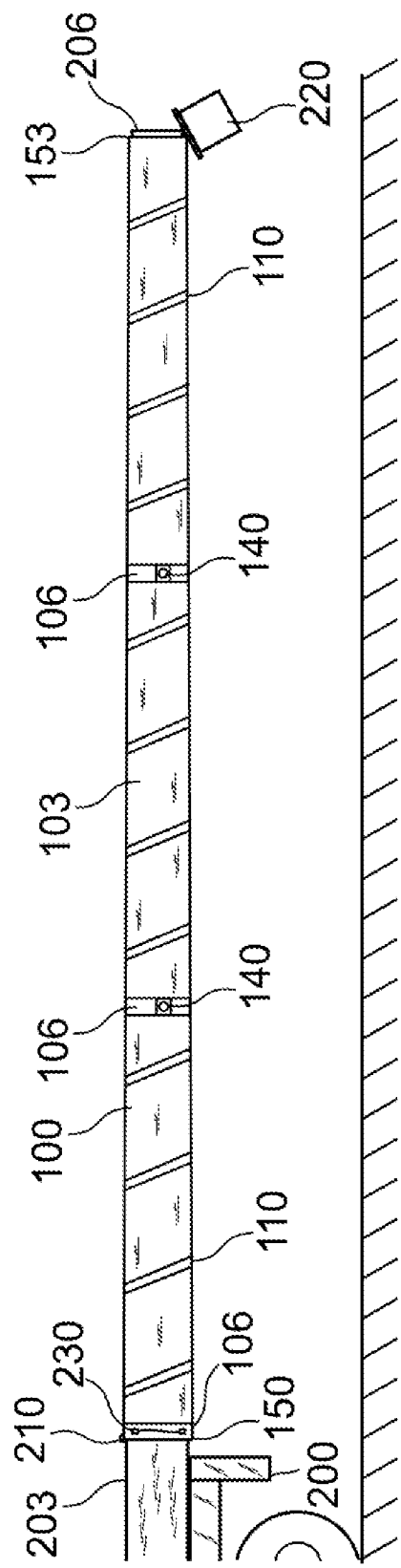
FIG. 2 shows a partial elevation view of a vehicle carrying a utility pole with a caution indicator that includes the caution sleeve.

FIGS. 1 and 2 depict a Caution Sleeve 100, Primary sleeve material 103, Material reinforcement 106, Reflective material 110, End grommet 130, Interior grommets 140, First end 150, Second end 153, Vehicle 200, Pole 203, Pole end 206, Staple 210, Flag 220 and Handles 230. Caution Sleeve 100 may be predominantly constructed of Primary sleeve material 103 and reinforced at various points with Material reinforcement 106. Primary sleeve material 103 may comprise a resilient polymeric or fabric sheet and may be constructed of materials commonly associated with tarpaulins. Material reinforcement 106 may act to resist tearing and other potential damage to Caution Sleeve 100, particularly when fasteners are used to secure Caution Sleeve 100 at grommets located in the Material reinforcement 106 areas. Reflective material 110 may be placed at various locations along the length of Caution Sleeve 100 to enhance the visibility of Caution Sleeve 100 and a majority of sleeve 100 may be high visibility material with retroreflective material and fluorescent material being the predominant materials in Caution Sleeve 100. Reflective material 110 may be retroreflective material and the base material of Caution Sleeve 100 may be fluorescent material. End grommet 130 may be used to affix Caution Sleeve 100 to a Pole 203 particularly when Pole 203 is being carried by Vehicle 200. There may be two or more of End grommet 130. Staple 210 or other comparable fasteners may be used to securely affix Caution Sleeve 100 onto Pole 203. Interior grommets 140 may be used when the length of Caution Sleeve 100 significantly exceeds that of the portion of Pole 203 that overhangs Vehicle 200. In such cases Interior grommets 140 may be fastened to one another in a way that folds or crumples the middle section of Caution Sleeve 100. Alternatively, Interior grommets 140 may be attached to Pole 203 at either end of Caution Sleeve 100 in a manner that folds or crumples an end of Caution Sleeve 100. Interior grommets 140 may be used in either of these methods alone, in combination with one another or in combination with other methods to control the length of Caution Sleeve 100. Pole 203 may be positioned such that the larger end of Pole 203 is located on the Vehicle 200 side of Pole 203 and such that the smaller end of Pole 203 is located on the free end of Pole 203 which protrudes away from Vehicle 200. Caution Sleeve 100 may be placed over Pole 203 such that the First end 150 of Caution Sleeve 100 may be nearest Vehicle 200 and the Second end 153 of Caution Sleeve 100 is oriented adjacent to Pole end 206 and opposite Vehicle 200. Flag 220 may be positioned on Pole end 206 adjacent to Second end 153 or may be affixed to the end of Caution Sleeve 100.

Material reinforcement 106 at First end 150 may have an individual handle or pair of handles, such as Handles 230, for pulling the Caution Sleeve 100 onto Pole 203. Further, Second end 153 may have a clip or other attachment mechanism for directly attaching a flag to Second end 153. Handles 230 may be used to aid in the installation and removal of Caution Sleeve 100 onto and from Pole 203.

The caution sleeve length may, for example, be 12.0 feet with certain examples falling between 4.0 and 18.5 feet and a significant number of those examples falling between 8.0 and 15.3 feet.

As that phrase is used herein the "primary opening" is the opening in the caution sleeve that the pole enters through and is typically situated adjacent to or near the vehicle carrying the pole during hauling of the pole. As that phrase is used herein the "protruding end" is the end of the caution sleeve opposite the primary opening. As such, the caution sleeve installation may begin by sliding the pole into the primary opening and pulling the sleeve down the pole until the pole end reaches the protruding end of the caution sleeve. The protruding end may be open, closed or partially open. Heavy-duty industrial staples or some other similar fastener may be used to affix Caution Sleeve 100 in position on Pole 203.

As that phrase is used herein "sleeve end size" represents the circumference of the largest cylinder that can fit within the sleeve end. The primary opening sleeve end size may, for example, be 56.5 inches with certain examples falling between 28.3 and 126.0 inches and a significant number of those examples falling between 42.4 and 91.3 inches.

The protruding end sleeve end size may, for example, be 47.1 inches with certain examples falling between 25.1 and 110.0 inches and a significant number of those examples falling between 36.1 and 78.6 inches.

The sleeve length divided by the primary opening sleeve end size may, for example, be 2.6 with certain examples falling between 1.0 and 6.0 and a significant number of those examples falling between 1.8 and 4.3.

The embodiments described herein may have particular utility when the pole being carried is at least 40 feet in length. The embodiments described herein may have further utility when the pole being carried is at least 45 feet in length and even further utility when the pole being carried is at least 50 feet in length. The pole length may for example be 55 feet.

As that term is used herein "florescent" has a meaning consistent with the use of that term in ANSI/ISEA 107. Further, as that term is used herein "retroreflective" has a meaning consistent with the use of that term in ANSI/ISEA 107.

As that term is used herein "vehicle" includes for example trucks and trailers. In many cases, the vehicle will be a trailer and in several such cases the trailer would be a trailer designed to carry poles exceeding 40 feet.

A caution indicator described herein may, for example, comprise a vehicle; a pole; a sleeve; a primary opening on a vehicle end of the sleeve; and a sleeve protruding end opposite the vehicle end of the sleeve; such that the pole is secured onto the vehicle; the pole overhangs a rear end of the vehicle by an exposed pole length; the sleeve is secured onto the pole; the sleeve envelops a portion of the pole; the sleeve protruding end is adjacent to a flag and the flag is at least 12 inches×12 inches. In a related example, the exposed pole length may be greater than 5 feet. In a further related example, the sleeve may cover most of the exposed pole length. In a further related example, the sleeve may include a grommet hole adjacent to the primary opening. In a further related example, the sleeve may be at least 5 feet long. In a further related example, the primary opening may have a primary opening sleeve end size of at least 25.1 inches. In a further related example, the sleeve protruding end may have a protruding end sleeve end size of at least 25.1 inches. In a further related example, the primary opening may have a primary opening sleeve end size that is at least as great as a protruding end sleeve end size. In a still further related example, the sleeve may comprise a florescent material. In a still further related example, the sleeve may include a retroreflective material. In a still further related example, the pole may be at least forty feet long. In a still further related example, the vehicle may be a trailer. In a still further related example, the pole may be a utility pole.

A caution indicator described herein may, for example, comprise a sleeve; a primary opening on a first end of the sleeve; a sleeve protruding end positioned opposite the first end of the sleeve; a grommet hole adjacent to the primary opening and a handle adjacent to the primary opening such that the sleeve is at least 8 feet long; the sleeve protruding end has a protruding end sleeve end size of at least 25.1 inches; the primary opening has a primary opening sleeve end size of at least the protruding end sleeve end size; the sleeve comprises a florescent material and the sleeve comprises a retroreflective material.

The above-described embodiments have a number of independently useful individual features that have particular utility when used in combination with one another including combinations of features from embodiments described separately. There are, of course, other alternate embodiments which are obvious from the foregoing descriptions, which are intended to be included within the scope of the present application.

I claim:

1. A caution indicator comprising:
   a. a vehicle;
   b. a pole;
   c. a sleeve;
   d. a primary opening on a vehicle end of the sleeve; and
   e. a sleeve protruding end opposite the vehicle end of the sleeve;
   f. wherein the pole is secured onto the vehicle;
   g. wherein the pole overhangs a rear end of the vehicle by an exposed pole length;
   h. wherein the sleeve is secured onto the pole;
   i. wherein the sleeve envelops a portion of the pole;
   j. wherein the sleeve protruding end is adjacent to a flag;
   k. wherein the flag is at least 12 inches×12 inches;
   l. wherein the sleeve comprises a sheet member and the sheet member envelops the pole in a space between the vehicle end of the sleeve and the sleeve protruding end and
   m. wherein the sleeve has a tubular form in the space between the vehicle end of the sleeve and the sleeve protruding end.

2. The caution indicator of claim 1 wherein the exposed pole length is greater than 5 feet.

3. The caution indicator of claim 1 wherein the sleeve covers most of the exposed pole length.

4. The caution indicator of claim 1 wherein the sleeve comprises a grommet hole adjacent to the primary opening.

5. The caution indicator of claim 1 wherein the sleeve is at least 5 feet long.

6. The caution indicator of claim 1 wherein the primary opening has a primary opening sleeve end size of at least 25.1 inches.

7. The caution indicator of claim 1 wherein the sleeve protruding end has a protruding end sleeve end size of at least 25.1 inches.

8. The caution indicator of claim 1 wherein the primary opening has a primary opening sleeve end size that is at least as great as a protruding end sleeve end size.

9. The caution indicator of claim 1 wherein the sleeve comprises a florescent material.

10. The caution indicator of claim 1 wherein the sleeve comprises a retroreflective material.

11. The caution indicator of claim 1 wherein the pole is at least forty feet long.

12. The caution indicator of claim 1 wherein the vehicle is a trailer.

13. The caution indicator of claim 1 wherein the pole is a utility pole.

14. The caution indicator of claim 1:
   a. wherein the exposed pole length is greater than 5 feet;
   b. wherein the sleeve is at least 5 feet long;
   c. wherein the primary opening has a primary opening sleeve end size of at least 25.1 inches;
   d. wherein the sleeve protruding end has a protruding end sleeve end size of at least 25.1 inches and
   e. wherein the pole is at least forty feet long.

15. A caution indicator comprising:
   a. a vehicle;
   b. a pole;
   c. wherein the pole is secured onto the vehicle;
   d. a sleeve;
   e. wherein the sleeve is secured onto the pole;
   f. a primary opening on a first end of the sleeve;
   g. a sleeve protruding end positioned opposite the first end of the sleeve;
   h. a grommet hole adjacent to the primary opening and
   i. a handle adjacent to the primary opening;
   j. wherein the sleeve is at least 8 feet long;
   k. wherein the sleeve protruding end has a protruding end sleeve end size of at least 25.1 inches;
   l. wherein the primary opening has a primary opening sleeve end size of at least the protruding end sleeve end size;
   m. wherein the sleeve comprises a florescent material and
   n. wherein the sleeve comprises a retroreflective material;
   o. wherein the sleeve comprises a sheet member and the sheet member forms a tube that is at least 8 feet long;
   p. wherein the sheet member comprises a florescent material and
   q. wherein the sheet member comprises a retroreflective material.

16. The caution indicator of claim 15:
   a. wherein the primary opening has a primary opening sleeve end size of at least 25.1 inches and;
   b. wherein the sleeve protruding end has a protruding end sleeve end size of at least 25.1 inches.

* * * * *